(No Model.) 3 Sheets—Sheet 1.
H. W. EISENHART.
CULTIVATOR.
No. 495,404. Patented Apr. 11, 1893.
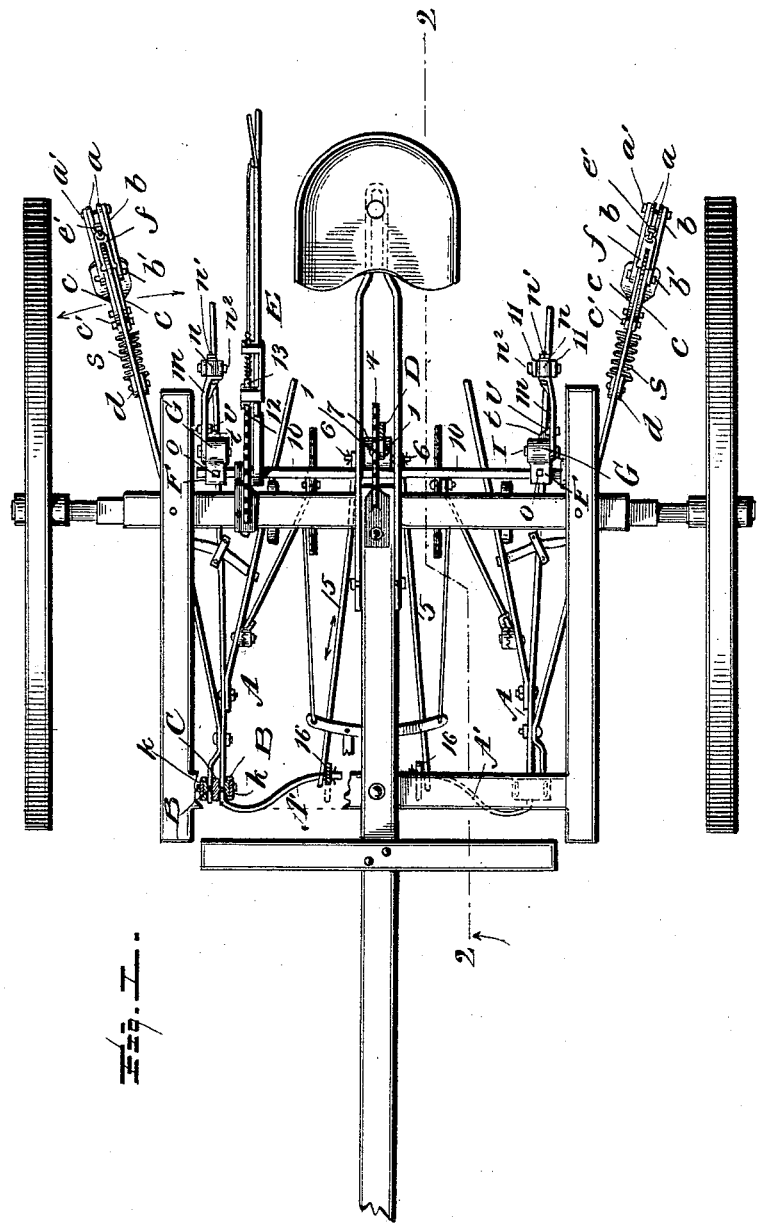
Witnesses:
L. C. Hills
Inventor
Henry W. Eisenhart
by Marcellus Bailey
Attorney (No Model.) 3 Sheets—Sheet 2.
H. W. EISENHART.
CULTIVATOR.
No. 495,404. Patented Apr. 11, 1893.
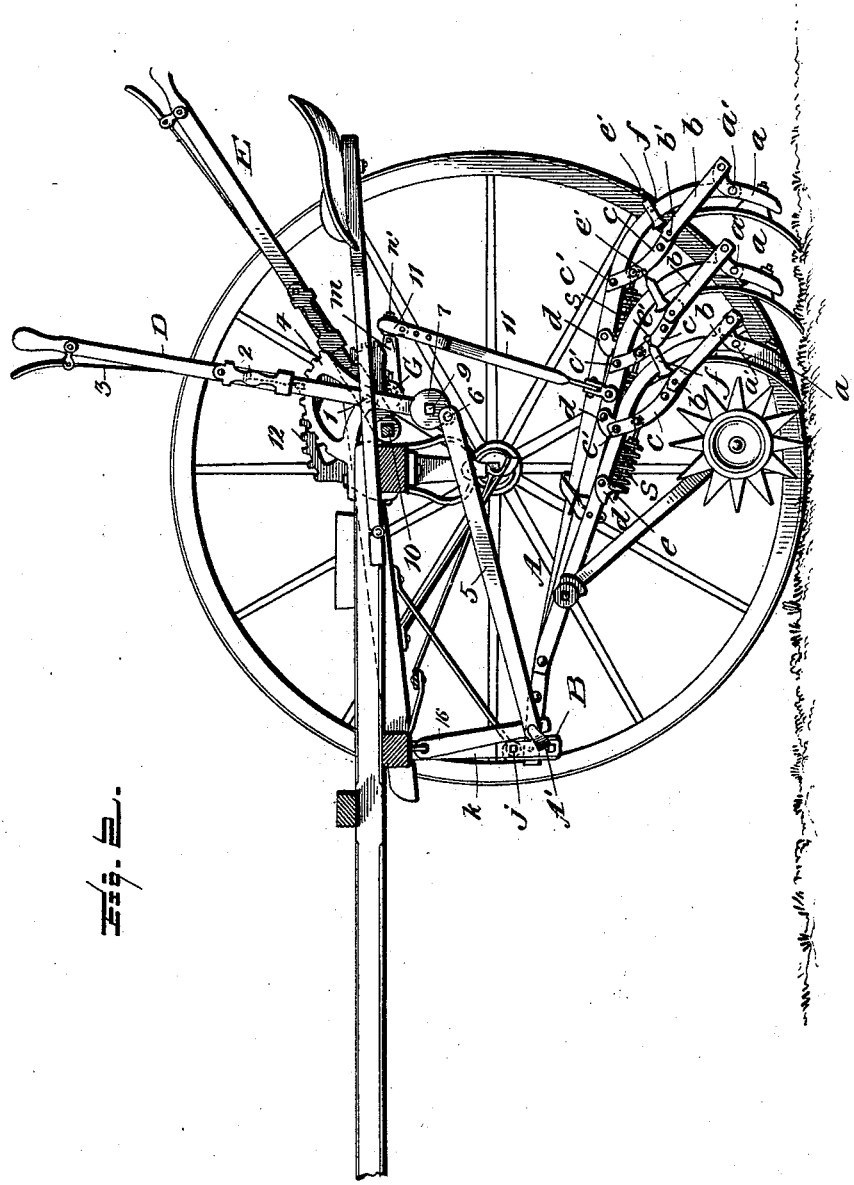
Witnesses
L. C. Hills.
Ewell A. Dick
Inventor
Henry W. Eisenhart
Marcellus Bailey
Attorney (No Model.) 3 Sheets—Sheet 3.
H. W. EISENHART.
CULTIVATOR.
No. 495,404. Patented Apr. 11, 1893.
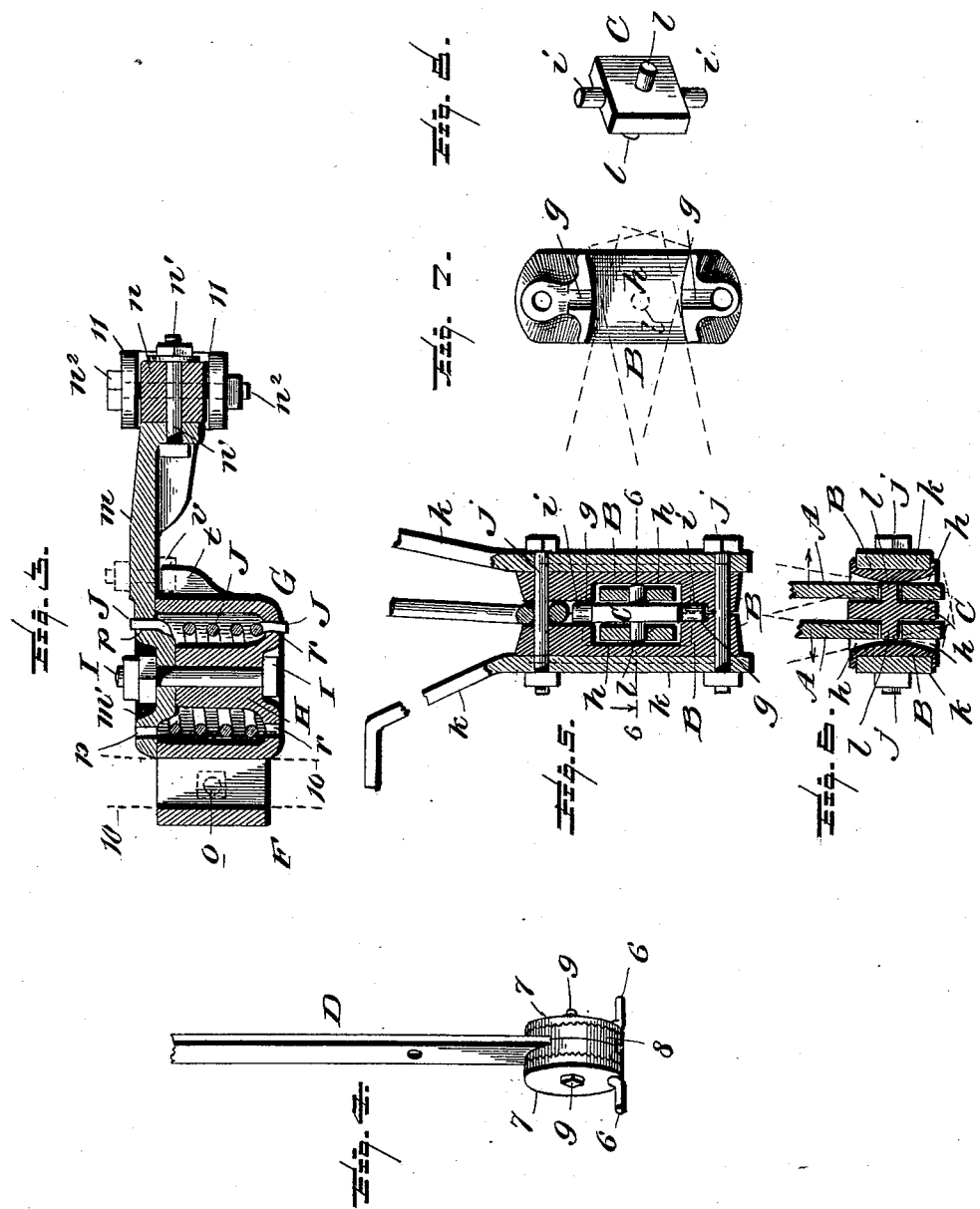
Witnesses
L. C. Hills
Wella Dick
Inventor
Henry W. Eisenhart
by Marcellus Bailey
Attorney

UNITED STATES PATENT OFFICE.

HENRY W. EISENHART, OF YORK, PENNSYLVANIA, ASSIGNOR TO A. B. FARQUHAR, OF SAME PLACE.

CULTIVATOR.

SPECIFICATION forming part of Letters Patent No. 495,404, dated April 11, 1893.

Application filed December 21, 1892. Serial No. 455,934. (No model.)

*To all whom it may concern:*

Be it known that I, HENRY W. EISENHART, of York, in the State of Pennsylvania, have invented certain new and useful Improvements in Cultivators, of which the following is a specification.

My invention relates mainly to the lateral adjustment and raising and lowering of the shovel beams or drag bars of cultivators, as well as to the application of spring or yielding pressure to those beams; and it consists in the improved means for these purposes which I will presently describe. I have also devised a simple and efficient means of adjusting the pitch of the points of the spring hoes or shovels carried by the beams or drag bars.

I will first describe my improvements in detail by reference to the accompanying drawings, and will then point out in the claims those features which I believe to be new and of my own invention.

In the drawings—Figure 1 is a plan view, partly in section, of a riding cultivator embodying my improvements in their preferred form. In this figure a portion of the front of the frame is broken away to expose the parts beneath; the operating lever for laterally adjusting the shovel beams or drag bars is cut off; and but one of the drag bars of each gang or section is represented as provided with its spring shovel or hoe,—the others being omitted as unnecessary, and in order not to render the drawing obscure. Fig. 2 is a section on the line 2—2, Fig. 1. Fig. 3 is a horizontal longitudinal section on enlarged scale of the attachment by which the beams or drag bars are lifted and lowered, and spring pressure is applied to them. Fig. 4 is a perspective view of a part of the lever for laterally adjusting the two gangs or sections of beams or drag bars, together with the ratchet faced clips to which are joined the connecting rods that extend between said lever and the beams. Fig. 5 is a transverse vertical central section of the joint at the front end of each section or gang of beams. Fig. 6 is a section on line 6—6 Fig. 5. Fig. 7 is a view of the inner face of one of the two bearing blocks of the joint. Fig. 8 is a view of the swiveled joint plate which is mounted in the pair of bearing blocks.

There are in this instance four drag bars in each gang—three of them carrying spring hoes, and one of them carrying a star or toothed wheel. At their front ends they come together and constitute in effect a single beam A, as usual. The spring hoes in their general arrangement do not differ materially from other hoes of the kind, each having a shovel standard $a$ pivoted at $a'$ to the beam, and joined at its upper and shorter end by a connecting bar or rod $b$, to a lever $c$ pivoted at $c'$ to the beam; a spring $s$ located on the under side of the beam and confined between a bracket $d$ on the beam, and the lever $c$, encircles a rod $e$ pinned to the lever and passing through and adapted to slide in the bracket $d$. Upon the beam I mount a loop shaped stop $f$ which fits and can be slid along the beam to furnish an adjustable stop for the joint or pivot $b'$ between the connecting rod $b$ and the lever $c$, so as to hold this point $b'$ in desired relation to the centers $a'$ and $c'$. A set screw $e'$ on the sliding loop shaped stop $f$ holds it in adjusted position. In this connection I remark that I am aware that an adjustable stop for the purpose just indicated is not new with me broadly considered. My improvement in this direction resides in the special construction and arrangement of the stop $f$. Each beam A at its front end is hung so that it may move both up and down and laterally. And to this end I provide for it a double hinge joint, by which it is made capable of swinging or rocking upon both a horizontal and a vertical axis. This joint is shown in detail in Figs. 5-8 inclusive. It is composed of two cheek-pieces or bearing blocks B, the interior opposite faces of which are formed as shown in Fig. 7, having top and bottom half recesses or sockets $g$, to receive the top and bottom pivots $i$ of the swiveled joint plate C, and an intermediate clearance $h$ to accommodate the body of that plate. These blocks, when the joint plate is fitted between them are bound and clamped together by cross bolts $j$ and by suitable hangers and braces $k$ are rigidly connected to the frame of the cultivator. The plate C has on it horizontal pins or studs $l$ to receive the forked front end of the beam A which pivots on these pins. The forked end of the beam is of course fitted to these pivot pins before the swiveled joint plate is fitted to the bearing blocks B. In this way the beam is pivoted to the plate C on a horizontal axis, while the plate C itself is pivoted in the bearing blocks on a vertical axis. Thus the two beams A not only can move up and down, so as to raise and lower their plow or hoe points, but they can swing horizontally to and fro in order to allow them to be set nearer to or farther from each other. Their adjustment in a horizontal plane is effected by means of a lever D pivoted at 1 to the frame, and having the customary spring pressed sliding dog or tooth 2, and operating rod 3 therefor, to engage a notched quadrant 4 on the frame, so that the lever can be held in adjusted position. The lower and shorter arm of the lever is by connecting rods 5 joined to horizontal crank arms A' extending inwardly or toward the center of the machine one from the front end of each beam A—each crank arm for greater security being upheld at its outer end by a supporting bar 16 loosely jointed at the top to the under side of the frame, and at the bottom to the outer end of the arm. By moving the lever, the arms A' will be vibrated in a direction to cause the beams A to swing horizontally away from or toward each other; or in other words the beams are vibrated or caused to swing upon their vertical axes in opposite directions so as to simultaneously approach or recede from each other according to the direction of movement of the lever.

In order to secure the even and uniform set of the beams in the first instance, I connect the connecting rods 5 to the lever D by mounting them on crank or eccentric pins 6 on the exterior opposite faces of two ratchet faced clips 7, mounted on opposite sides of the lever with their ratchet faces engaging the corresponding ratchet faces of a split hub 8 on the lever—these parts being held together by a clamping cross bolt 9. By loosening the bolt, either one of the clips 7, as occasion may demand, can be rotated to the extent required to cause its crank pin 6 to throw the arm A' with which it is connected far enough in one direction or the other to insure the proper initial set or adjustment of its beam A with relation to the other beam; after which the adjustment can be retained by tightening up the bolt 9. The vertical adjustment of the beams is effected by means of crank arms $m$ made fast to a cross shaft 10 mounted in suitable bearings in the cultivator frame—said crank arms being connected to the beams A by rods 11 jointed at their lower ends to the beams and at their upper ends to the crank arms $m$. The shaft 10 is operated by the lever E which is made fast to it, and is combined (like the lever D) with the usual notched quadrant 12 and spring pressed sliding dog or tooth 13, by means of which the lever is held in adjusted position. By this lever E the shaft 10 can be rocked to raise or lower the beams. The joint between each arm $m$ and its connecting rod 11 must be a double one to permit the rod to swing not only lengthwise but crosswise of the machine—the latter movement being required to permit the rod to follow the lateral swinging movement of the beams to which it is attached. To this end, (as shown more plainly in Fig. 3) the arm $m$ has on its outer end a joint or bearing block $n$, hung on a horizontal pivot bolt $n'$ extending lengthwise of the machine; this swiveled bearing block, itself, carries a horizontal pivot bolt $n^2$ extending crosswise of the bolt $n'$; and on the bolt $n^2$ is hung the upper end of the connecting rod 11 which at this point is forked to pass up on each side of the bearing block and to fit on the laterally projecting ends of the bolt $n^2$. Through these instrumentalities I not only raise and lower the beams A but apply to them adjustable or variable spring pressure, using one and the same lever E for both purposes.

The manner in which this result is attained is as follows: Each arm $m$ forms part of a spring pressure attachment, the barrel of which is shown at F, said barrel being cast in one with a hub G which fits on the squared shaft 10, and is there held in place against lateral displacement by a set screw $o$. The attachment is constructed substantially as illustrated in Galloway's patent No. 432,664, of July 22, 1890, the barrel having within it a central stem H, axially perforated for the passage of the bolt I, there being between the stem and the case of the barrel an annular space in which the spring J is seated. The arm $m$ is formed with a circular boss $m'$ which fits in the open end of the barrel and seats itself on the head of the stem H, and is there held by the bolt I which forms a pivot on which the arm $m$ can turn. A series of holes $p$ is formed in the boss $m'$ and a corresponding series of holes $r$ is formed in the opposite head of the barrel. One end of the spring J is inserted in the selected one of the series of holes $p$ in the box $m'$, and the opposite end of the spring is inserted in the selected one of the series of holes $r$ in the head of the barrel. In this way any desired initial tension of the coiled spring can be obtained. The barrel has on it a lug $t$, which comes under a corresponding lug $v$ on the arm $m$. In this way when the shaft 10 is rotated in the direction required to lift the beams A, the lugs $t$ of the barrels will, by engaging the lugs $v$ on the arms $m$, lift the arms and consequently the beams. When on the other hand, the shaft is rotated in the opposite direction, the beams A are permitted to drop, the arms $m$ and the spring barrels F moving together until the shovels reach the ground. After this by a still further movement of the operating lever E and a consequent further rotation of the barrels F, the latter will move, independently of the arms $m$, thus increasing the tension of the springs J until the required spring pressure has been obtained, after which the operating lever E is locked to its quadrant.

With the aid of the foregoing instrumentalities I am enabled by means of the two operating levers D, E, to accurately and quickly adjust the parts, and to make any desired change in any of the adjustments controlled by those levers or either of them, even while the machine is in motion and in operation.

Having described my improvements and the best way now known to me of carrying the same into effect, what I claim herein as new and of my own invention is—

1. In combination with the pivoted laterally swinging beams, and their crank arms or ends, the operating levers, the adjustable ratchet face rods jointed at one end to the crank arms or ends of the beams, and at the other end eccentrically connected to the ratchet faced clips, substantially as and for the purposes hereinbefore set forth.

2. The bearing block connected to and supported from the cultivator frame, in combination with the oscillatory joint plate pivoted in said bearing block, and the beam or drag bar, pivoted to the joint plate upon an axis at right angles to that of the oscillatory joint plate, substantially as and for the purposes hereinbefore set forth.

3. The beams hinged at their front ends to vibrate in both a vertical and a horizontal plane, and provided at these ends with the oppositely projecting crank arms A', in combination with the operating lever D and connecting rods 5, substantially as and for the purposes hereinbefore set forth.

4. The combination of the beams hinged to move both in a vertical and a horizontal plane; the two operating levers D, E; connections substantially as described between the levers and the beams whereby the beams by the one lever are caused to simultaneously swing to and from each other, and by the other lever E are simultaneously raised and lowered; and spring pressure mechanism for the beams connected to and operated by the lifting and lowering lever E, substantially as hereinbefore set forth.

5. The adjustable loop shaped stop $f$ and its set screw fitting and adapted to slide on the beam, in combination with the beam, the pivoted shovel standard $a$, the connecting rod $b$ and pivoted lever $c$, and the spring $s$, as and for the purposes set forth.

In testimony whereof I affix my signature in presence of two witnesses.

HENRY W. EISENHART.

Witnesses:
   B. H. FARQUHAR,
   G. P. SPANGLER.